(12) United States Patent
Yeh et al.

(10) Patent No.: US 8,922,996 B2
(45) Date of Patent: Dec. 30, 2014

(54) HANDHELD ELECTRONIC APPARATUS WITH KICKSTAND

(71) Applicant: HTC Corporation, Taoyuan, Taoyuan County (TW)

(72) Inventors: Han-Wen Yeh, Taoyuan (TW); Jeng-Wen Lin, Taoyuan (TW); Jih-Chen Yeh, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 224 days.

(21) Appl. No.: 13/627,118

(22) Filed: Sep. 26, 2012

(65) Prior Publication Data

US 2014/0085777 A1    Mar. 27, 2014

(51) Int. Cl.
*H05K 5/00* (2006.01)
*H05K 7/00* (2006.01)
*G06F 1/16* (2006.01)

(52) U.S. Cl.
USPC ............... 361/679.59; 361/679.56; 361/679.3

(58) Field of Classification Search
USPC .............................. 361/679.3, 679.56, 679.59
See application file for complete search history.

(56) References Cited

U.S. PATENT DOCUMENTS

| | | | | |
|---|---|---|---|---|
| 6,016,248 A * | 1/2000 | Anzai et al. | ............... | 361/679.59 |
| 8,081,429 B2 * | 12/2011 | Horie | ........................ | 361/679.02 |
| 8,081,446 B2 * | 12/2011 | Hsu | .......................... | 361/679.55 |
| 8,243,427 B2 * | 8/2012 | Fu | ............................. | 361/679.21 |
| 8,243,428 B2 * | 8/2012 | Fu | ............................. | 361/679.21 |
| 8,243,432 B2 * | 8/2012 | Duan et al. | ................. | 361/679.3 |
| 8,335,079 B2 * | 12/2012 | Yeh | ......................... | 361/679.56 |
| 8,390,995 B2 * | 3/2013 | Wang et al. | ............... | 361/679.21 |
| 8,576,557 B2 * | 11/2013 | Chu | ............................ | 361/679.3 |
| 8,724,319 B2 * | 5/2014 | Shih | ......................... | 361/679.59 |
| 2001/0046116 A1 | 11/2001 | Amemiya et al. | | |
| 2007/0008685 A1 | 1/2007 | Hsiung | | |
| 2009/0009667 A1 * | 1/2009 | Dayan | ........................... | 348/838 |
| 2011/0164358 A1 * | 7/2011 | Duan et al. | ............... | 361/679.01 |

* cited by examiner

*Primary Examiner* — Anthony Haughton
(74) *Attorney, Agent, or Firm* — McClure, Qualey & Rodack, LLP (57) ABSTRACT

A kickstand includes a holder, a bar, a shaft assembly, a cam assembly, and at least one spring washer. The bar is pivotally connected to the holder by the shaft assembly. The cam assembly is engaged with the holder and the bar and pivotally connected to the shaft assembly, so as to allow the bar to rotate relative to the holder to a closing position or an opening position selectively. The spring washer is engaged with the shaft assembly and abuts against the cam assembly.

20 Claims, 8 Drawing Sheets

HANDHELD ELECTRONIC APPARATUS WITH KICKSTAND

BACKGROUND

1. Technical Field

The present disclosure relates to a handheld electronic apparatus with a kickstand.

2. Description of Related Art

A handheld electronic apparatus is an electronic apparatus convenient for a user to carry and operate. A handheld electronic apparatus is small and lightweight and so is easily carried about by a user. Common handheld electronic apparatuses include mobile phones, multimedia players, PDAs (Personal Digital Assistants), handheld game consoles, PNDs (Portable Navigation Devices), notebook computers, etc.

At present, handheld electronic apparatuses sold in the market are usually not equipped with support brackets or kickstands. Therefore, if a user wants to enjoy video of a film, for example, by placing a handheld electronic apparatus on a table, the handheld electronic apparatus must be assembled to an auxiliary device (e.g., a dock, a kickstand, etc.) so that the handheld electronic apparatus can be made to stand erect.

However, the user may be unwilling to separately purchase such a dock, and if a dock is included as part of the handheld electronic apparatus package, overall costs are increased. Furthermore, carrying the dock is inconvenient. Alternatively, if a conventional kickstand is used to support the handheld electronic apparatus, the user can only use one of the edges of the handheld electronic apparatus for contact against a table because the kickstand may easily fold if any of the other edges of the handheld electronic apparatus are used. That is, the support provided by the conventional kickstand to maintain an angle between the handheld electronic apparatus and the conventional kickstand is weak.

SUMMARY

The disclosure provides an improved kickstand. A bar of the kickstand can rotate relative to a holder of the kickstand so as to form an angle between the bar and the holder by using a cam assembly cooperated with at least one spring washer. The spring washer can apply a strong abutting force to the cam assembly, so that the cam assembly can effectively maintain the angle. That is, the strong abutting force applied to the cam assembly prevents the bar from being easily folded to abut against the holder. Furthermore, the size of the spring washer is small, and so an efficient utilization of space is realized with the kickstand equipped with the spring washer.

According to an embodiment of the disclosure, a kickstand includes a holder, a bar, a shaft assembly, a cam assembly, and at least one spring washer. The bar is pivotally connected to the holder by the shaft assembly. The cam assembly includes a first cam unit and a second cam unit. The first cam unit is engaged with the holder, and the second cam unit is engaged with the bar and pivotally connected to the shaft assembly, so as to allow the bar to rotate relative to the holder to a closing position or an opening position selectively. The spring washer is engaged with the shaft assembly and abuts against the cam assembly.

In an embodiment of the disclosure, the first cam unit has a first contacting surface, and the first contacting surface at least has a first trough and a second trough. The second cam unit has a second contacting surface contacting the first contacting surface, and the second contacting surface at least has a crest. The bar rotates relative to the holder to the closing position when the crest is meshed with the first trough and rotates relative to the holder to the opening position when the crest is meshed with the second trough.

In an embodiment of the disclosure, the holder has a first accommodating recess and an opening communicated with the first accommodating recess. The bar includes a pivotal portion. The pivotal portion has a second accommodating recess. The second cam unit is disposed in the second accommodating recess. The pivotal portion is accommodated in the first accommodating recess. The first cam unit is engaged with the opening.

In an embodiment of the disclosure, the second cam unit further includes an engaging portion. The engaging portion is engaged with the inner wall of the second accommodating recess.

In an embodiment of the disclosure, the holder further has a first pivotal hole, and the first pivotal hole and the opening are respectively located at two opposite inner walls of the first accommodating recess. The pivotal portion further has a second pivotal hole communicated with the second accommodating recess. The shaft assembly is pivotally connected to the first pivotal hole and the second pivotal hole.

In an embodiment of the disclosure, the shaft assembly includes a shaft unit and a nut. The shaft unit sequentially passes through the first pivotal hole, the second pivotal hole, the second cam unit, the first cam unit, and the spring washer. The shaft unit has a head portion and a threaded portion respectively located at two ends of the shaft unit. The head portion abuts against the holder. The threaded portion protrudes out from the first cam unit. The nut is fastened to the threaded portion. The spring washer is compressed between the first cam unit and the nut.

In an embodiment of the disclosure, the first cam unit has a third pivotal hole. The second cam unit has a fourth pivotal hole. The shaft unit sequentially passes through the first pivotal hole, the second pivotal hole, the fourth pivotal hole, the third pivotal hole, and the spring washer.

In an embodiment of the disclosure, the holder further has a third accommodating recess. An end of the third accommodating recess is communicated with the first accommodating recess. The bar is accommodated in the third accommodating recess when the bar rotates relative to the holder to the closing position.

In an embodiment of the disclosure, the bar further has an abutting end adjacent to the pivotal portion. The abutting end abuts against the holder when the bar rotates relative to the holder to the opening position.

The disclosure further provides an improved handheld electronic apparatus. The handheld electronic apparatus uses the foregoing kickstand that is equipped with the spring washer, so the handheld electronic apparatus can stand erect on a table with the support of the kickstand, in which the kickstand does not easily fold. Moreover, because the strong abutting force applying to the cam assembly maintains the angle between the bar and the holder, the handheld electronic apparatus can stably stand erect on the table with any edge thereof with the support of the kickstand.

According to an embodiment of the disclosure, the handheld electronic apparatus includes a main body, a housing, and a kickstand. The housing is assembled to the back of the main body. The kickstand includes a holder, a bar, a shaft assembly, a cam assembly, and at least one spring washer. The holder is fixed to the housing. The bar is pivotally connected to the holder by the shaft assembly. The cam assembly includes a first cam unit and a second cam unit. The first cam unit is engaged with the holder, and the second cam unit is engaged with the bar and pivotally connected to the shaft assembly, so as to allow the bar to rotate relative to the holder to a closing position or an opening position selectively. The spring washer is engaged with the shaft assembly and abuts against the cam assembly.

In an embodiment of the disclosure, the housing has a first edge and a second edge opposite to the first edge. The main body has a power receptacle located at the first edge. The pivotal portion is adjacent to the second edge. The bar further has a standing end, and the standing end is adjacent to the first edge when the bar rotates relative to the holder to the closing position.

In an embodiment of the disclosure, the housing and the holder are integrally formed.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1A:
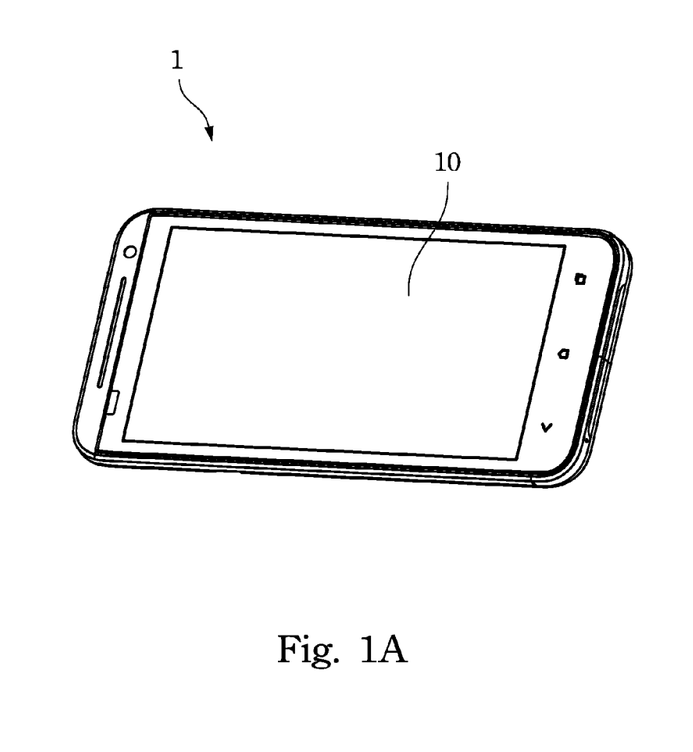
FIG. 1A is a perspective view of a handheld electronic apparatus according to an embodiment of the disclosure.
Figure 1B:
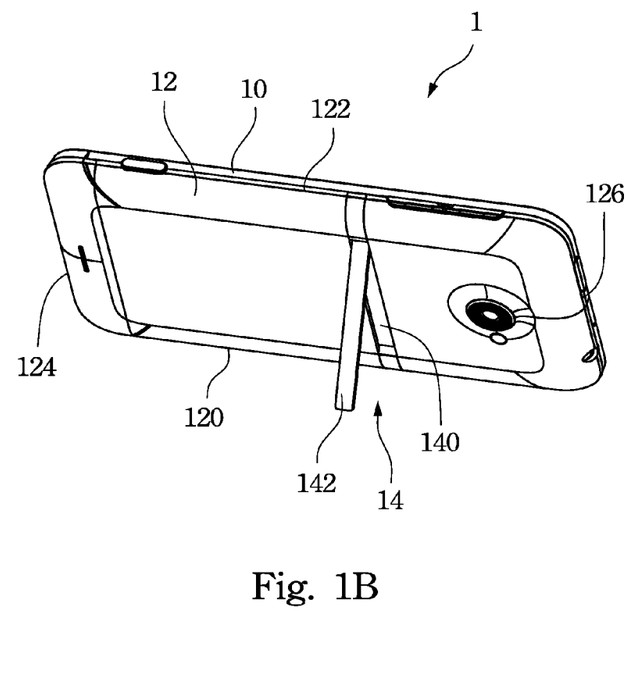
FIG. 1B is another perspective view of the handheld electronic apparatus in FIG. 1A, in which a bar of a kickstand is rotated relative to a holder of the kickstand to an opening position.

FIG. 1A is a perspective view of a handheld electronic apparatus 1 according to an embodiment of the disclosure. FIG. 1B is another perspective view of the handheld electronic apparatus 1 in FIG. 1A, in which a bar 142 of a kickstand 14 is rotated relative to a holder 140 of the kickstand 14 to an opening position.

As shown in FIG. 1A and FIG. 1B, a smartphone is taken as an example of the handheld electronic apparatus 1 of the disclosure, but the invention is not limited in this regard. The handheld electronic apparatus 1 of the disclosure can be a PDA (Personal Digital Assistant), a PND (Personal Navigation Device), a portable TV, a personal game console, a tablet PC (Personal Computer), an e-book reader, etc. That is, the handheld electronic apparatus 1 of the disclosure can be any electronic product that a user may desire to prop or stand erect on a table (not shown) during operation. As long as there is a requirement to prevent a kickstand used in the handheld electronic apparatus 1 from being easily folded, the concepts of the disclosure can be applied to design the kickstand.

As shown in FIG. 1A and FIG. 1B, the handheld electronic apparatus 1 includes a main body 10, a housing 12, and the kickstand 14. The housing 12 of the handheld electronic apparatus 1 is assembled to the back of the main body 10. The kickstand 14 of the handheld electronic apparatus 1 at least includes the holder 140 and the bar 142. The holder 140 of the kickstand 14 is assembled to the housing 12. The bar 142 of the kickstand 14 is pivotally connected to the holder 140, so as to rotate relative to the holder 140 to a closing position (i.e., the bar 142 flatly abuts against the holder 140) or an opening position (as shown in FIG. 1B) selectively. Components included in the kickstand 14 and connection relationships among the components are introduced in detail below.

Figure 2:
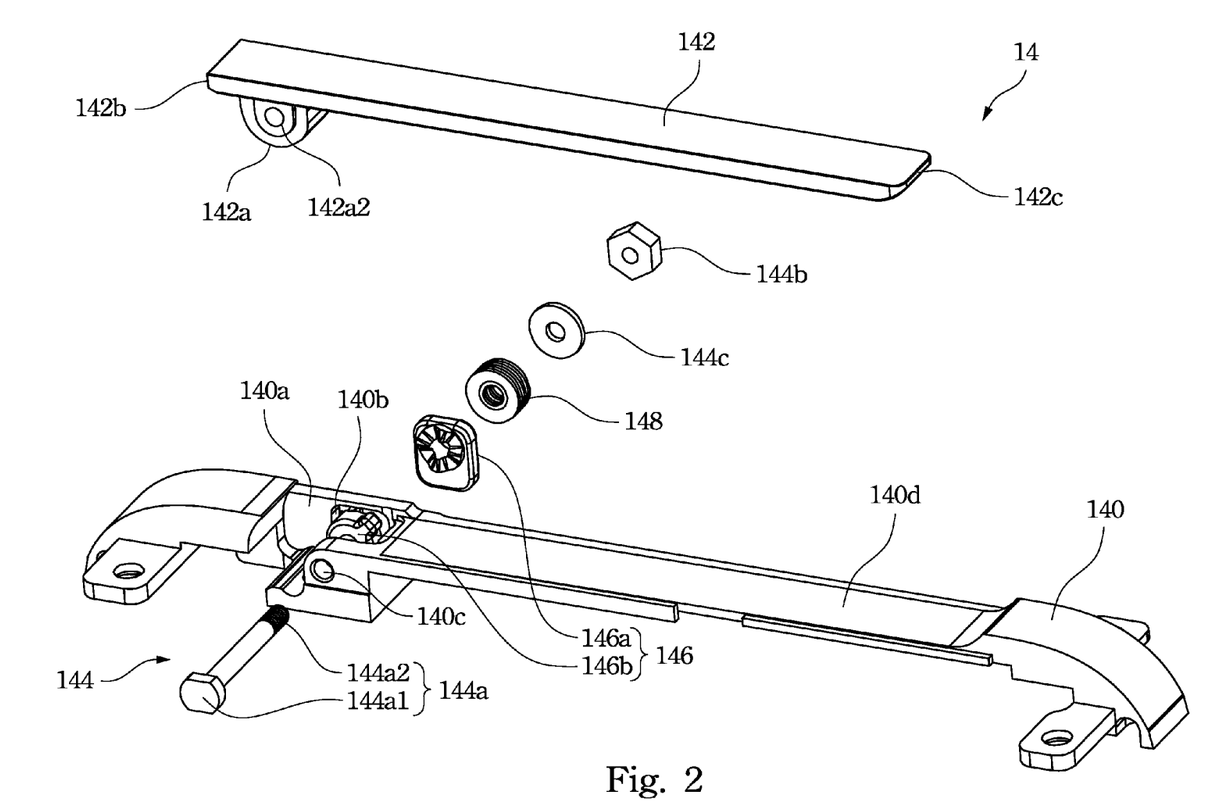
FIG. 2 is an exploded view of the kickstand in FIG. 1B.

FIG. 2 is an exploded view of the kickstand 14 in FIG. 1B.

As shown in FIG. 2, the kickstand 14 further includes a shaft assembly 144, a cam assembly 146, and a plurality of spring washers 148. The bar 142 of the kickstand 14 is pivotally connected to the holder 140 and the shaft assembly 144. The cam assembly 146 of the kickstand 14 is engaged with the holder 140 and the bar 142 and pivotally connected to the shaft assembly 144, so as to allow the bar 142 to rotate relative to the holder 140 to the closing position or the opening position selectively. The spring washers 148 are engaged with the shaft assembly 144 and abut against the cam assembly 146.

Figure 3A:
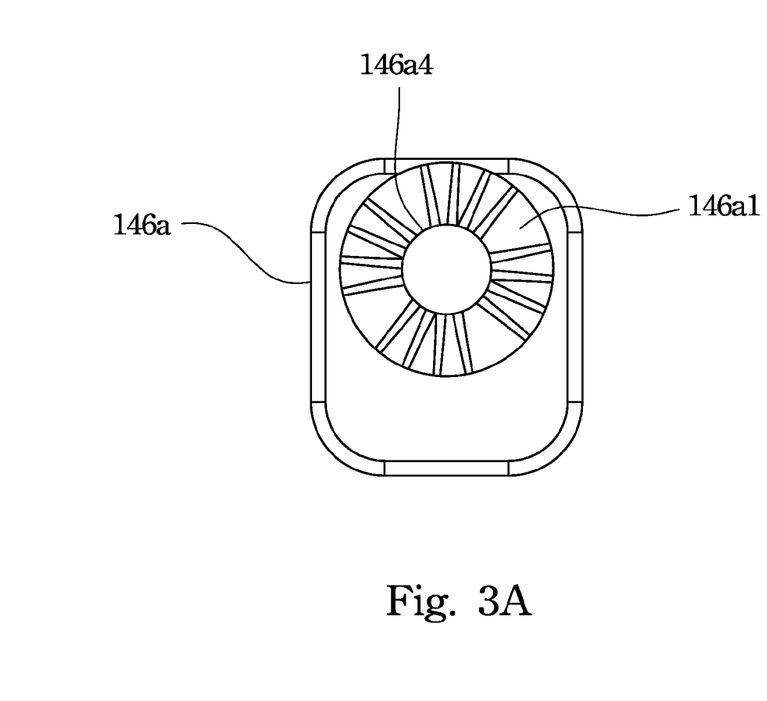
FIG. 3A is a front view of a first cam unit in FIG. 2.
Figure 3B:
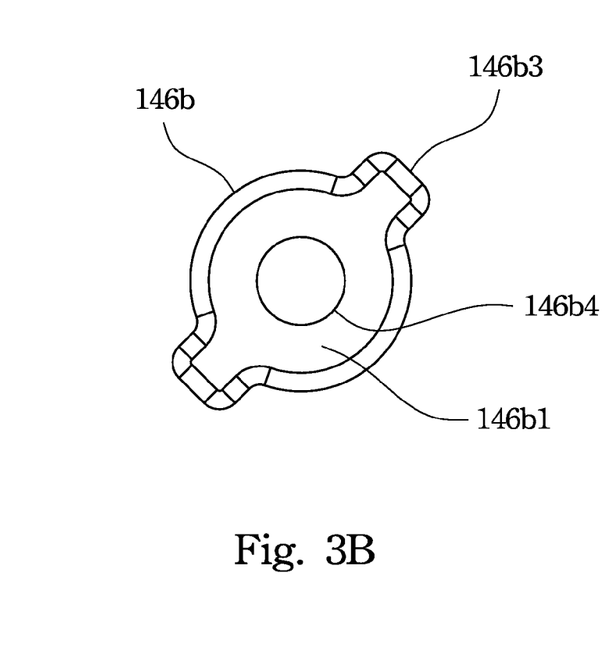
FIG. 3B is a front view of a second cam unit in FIG. 2.
Figure 4:
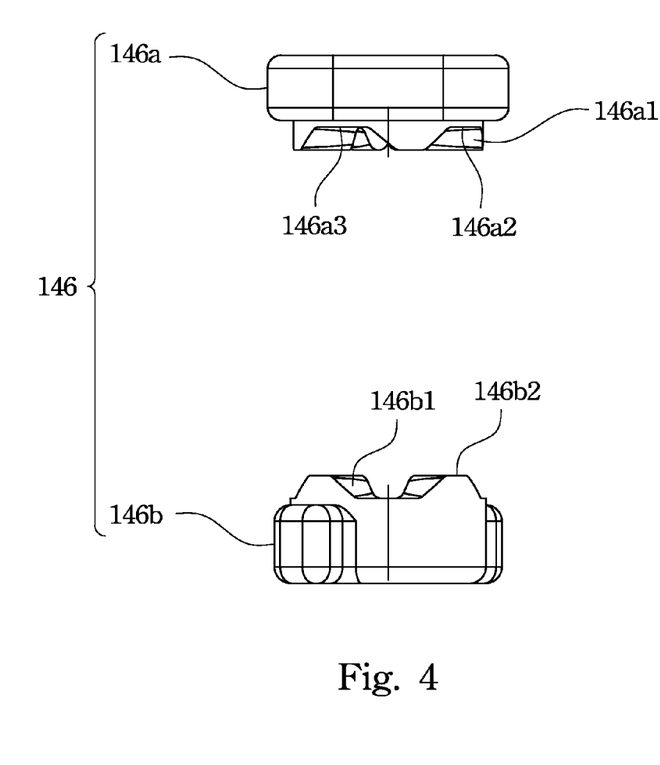
FIG. 4 is an exploded view of the first cam unit and the second cam unit in FIG. 2.

FIG. 3A is a front view of a first cam unit 146a in FIG. 2. FIG. 3B is a front view of a second cam unit 146b in FIG. 2. FIG. 4 is an exploded view of the first cam unit 146a and the second cam unit 146b in FIG. 2.

As shown in FIG. 3A, FIG. 3B, and FIG. 4, and with further reference to FIG. 2, the cam assembly 146 of the kickstand 14 includes the first cam unit 146a and the second cam unit 146b. The first cam unit 146a of the cam assembly 146 is engaged with the holder 140. The first cam unit 146a of the cam assembly 146 has a first contacting surface 146a1, and the first contacting surface 146a1 at least has a first trough 146a2 and a second trough 146a3. The second cam unit 146b of the cam assembly 146 is engaged with the bar 142 and pivotally connected to the shaft assembly 144. The second cam unit 146b of the cam assembly 146 has a second contacting surface 146b1 contacting the first contacting surface 146a1, and the second contacting surface 146b1 at least has a crest 146b2. In the embodiment of the disclosure, the bar 142 of the kickstand 14 rotates relative to the holder 140 to the closing position when the crest 146b2 is meshed with the first trough 146a2 and rotates relative to the holder 140 to the opening position when the crest 146b2 is meshed with the second trough 146a3, but the invention is not limited in this regard. In another embodiment of the disclosure, the first contacting surface 146a1 of the first cam unit 146a can further have other troughs for the crest 146b2 of the second contacting surface 146b1 to mesh with as needed, so as to make the bar 142 rotate relative to the holder 140 to other positions in addition to the closing position and the opening position.

Figure 5:
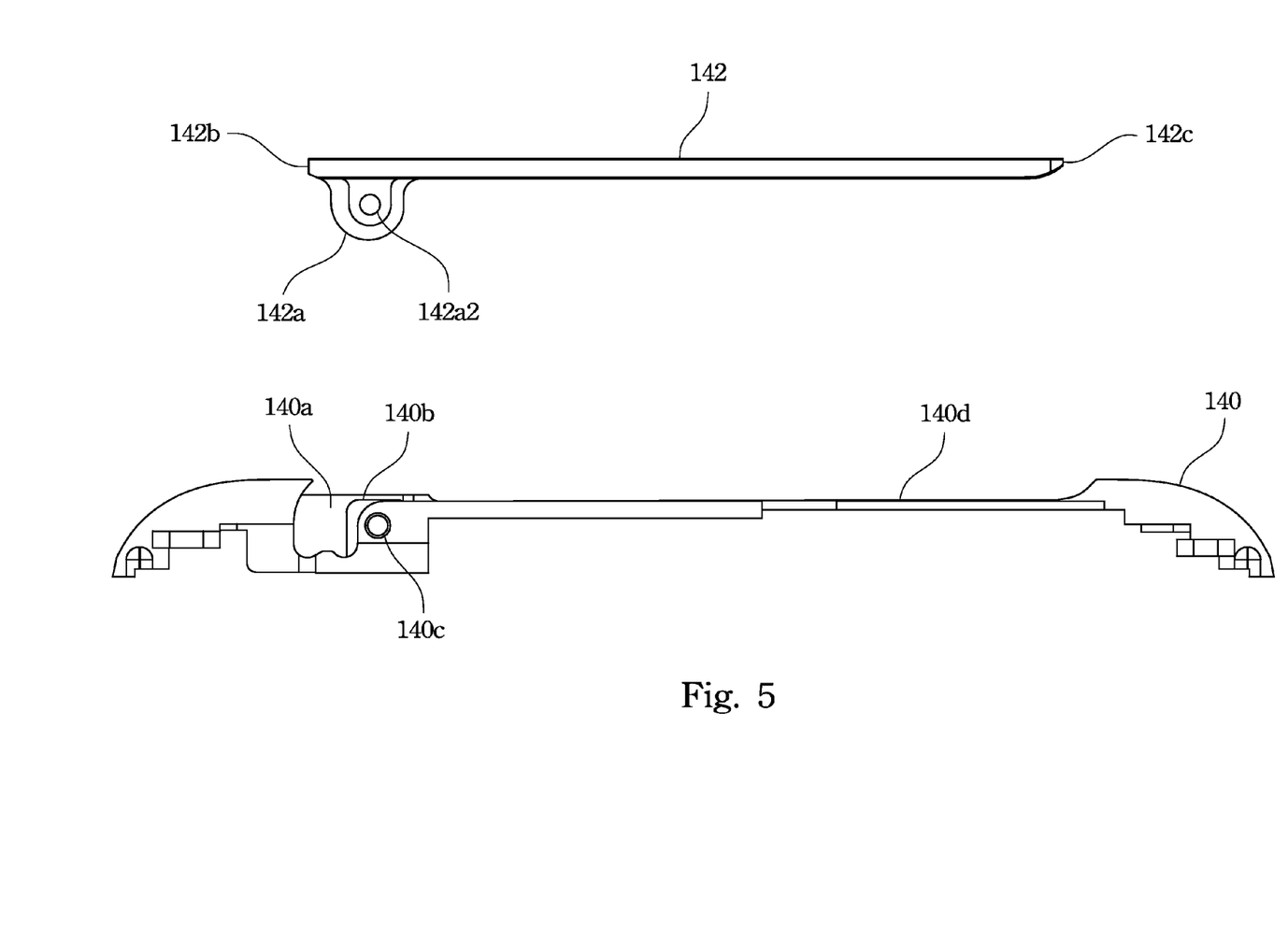
FIG. 5 is an exploded view of the holder and the bar in FIG. 2.
Figure 6:
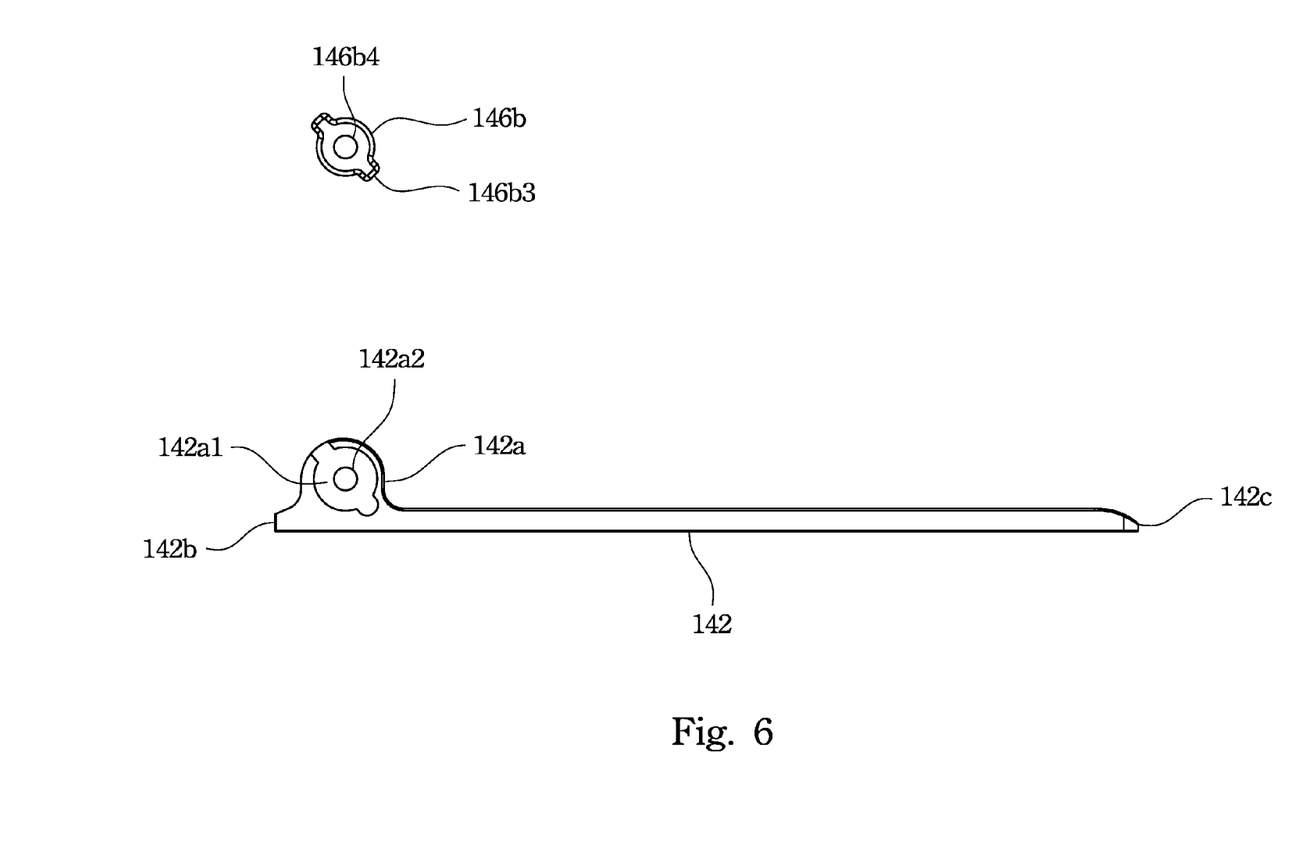
FIG. 6 is an exploded view of the bar and the second cam unit in FIG. 2.

FIG. 5 is an exploded view of the holder 140 and the bar 142 in FIG. 2. FIG. 6 is an exploded view of the bar 142 and the second cam unit 146b in FIG. 2.

As shown in FIG. 5 and FIG. 6, the bar 142 of the kickstand 14 includes a pivotal portion 142a. The holder 140 of the kickstand 14 has a first accommodating recess 140a and a first pivotal hole 140c communicated with the first accommodating recess 140a. The pivotal portion 142a of the bar 142 has a second accommodating recess 142a1 and a second pivotal hole 142a2 communicated with the second accommodating recess 142a1. The second cam unit 146b of the cam assembly 146 is disposed in the second accommodating recess 142a1 of the pivotal portion 142a. In greater detail, the second cam unit 146b of the cam assembly 146 further includes an engaging portion 146b3, and the engaging portion 146b3 is engaged with the inner wall of the second accommodating recess 142a1. The pivotal portion 142a of the bar 142 is accommodated in the first accommodating recess 140a of the holder 140. The shaft assembly 144 is pivotally connected to the first pivotal hole 140c of the holder 140 and the second pivotal hole 142a2 of the bar 142. Accordingly, the bar 142 can rotate relative to the holder 140 by the shaft assembly 144, and the bar 142 can rotate relative to the holder 140 to the closing position and the opening position selectively by the cam assembly 146.

Furthermore, the holder 140 of the kickstand 14 further has an opening 140b communicated with the first accommodating recess 140a, and the opening 140b and the first pivotal hole 140c are respectively located at two opposite inner walls of the first accommodating recess 140a. The first cam unit 146a of the cam assembly 146 is engaged with the opening 140b. That is, the first cam unit 146a of the cam assembly 146 is embedded in an inner wall of the first accommodating recess 140a, rather than abutting against the inner wall, so the width of the first accommodating recess 140a (in the axial direction of the first pivotal hole 140c) can be reduced. In another embodiment of the disclosure, the second accommodating recess 142a1 of the pivotal portion 142a can be omitted, and the second pivotal hole 142a2 of the pivotal portion 142a can be replaced by another opening (such as the opening 140b of the first accommodating recess 140a) for engaging with the second cam unit 146b of the cam assembly 146 (i.e., the second cam unit 146b is embedded in the pivotal portion 142a of the bar 142). Therefore, the thickness of the pivotal portion 142a (in the axial direction of the second pivotal hole 142a2) can be reduced, and the width of the first accommodating recess 140a used for accommodating the pivotal portion 142a and the second cam unit 146b can be further reduced.

Moreover, the holder 140 of the kickstand 14 further has a third accommodating recess 140d. An end of the third accommodating recess 140d is communicated with the first accommodating recess 140a. The bar 142 of the kickstand 14 is accommodated in the third accommodating recess 140d of the holder 140 when the bar 142 rotates relative to the holder 140 to the closing position.

As shown in FIG. 2, the shaft assembly 144 of the kickstand 14 includes a shaft unit 144a and a nut 144b. The shaft unit 144a of the shaft assembly 144 sequentially passes through the first pivotal hole 140c of the holder 140, the second pivotal hole 142a2 of the bar 142, the second cam unit 146b of the cam assembly 146, the first cam unit 146a of the cam assembly 146, and the spring washers 148. In greater detail as shown in FIG. 3A and FIG. 3B, the first cam unit 146a of the cam assembly 146 has a third pivotal hole 146a4, the second cam unit 146b of the cam assembly 146 has a fourth pivotal hole 146b4, and the shaft unit 144a of the shaft assembly 144 sequentially passes through the first pivotal hole 140c, the second pivotal hole 142a2, the fourth pivotal hole 146b4, the third pivotal hole 146a4, and the spring washers 148. The shaft unit 144a of the shaft assembly 144 has a head portion 144a1 and a threaded portion 144a2 respectively located at two ends of the shaft unit 144a. The head portion 144a1 is used to abut against an outer wall of the holder 140 that surrounds the first pivotal hole 140c. After the shaft unit 144a of the shaft assembly 144 sequentially passes through the first pivotal hole 140c, the second pivotal hole 142a2, the fourth pivotal hole 146b4, and the third pivotal hole 146a4 with the head portion 144a1 abutting against the outer wall of the holder 140, the threaded portion 144a2 of the shaft unit 144a protrudes out from the first cam unit 146a. The nut 144b of the shaft assembly 144 is fastened to the threaded portion 144a2 of the shaft unit 144a.

Figure 7:
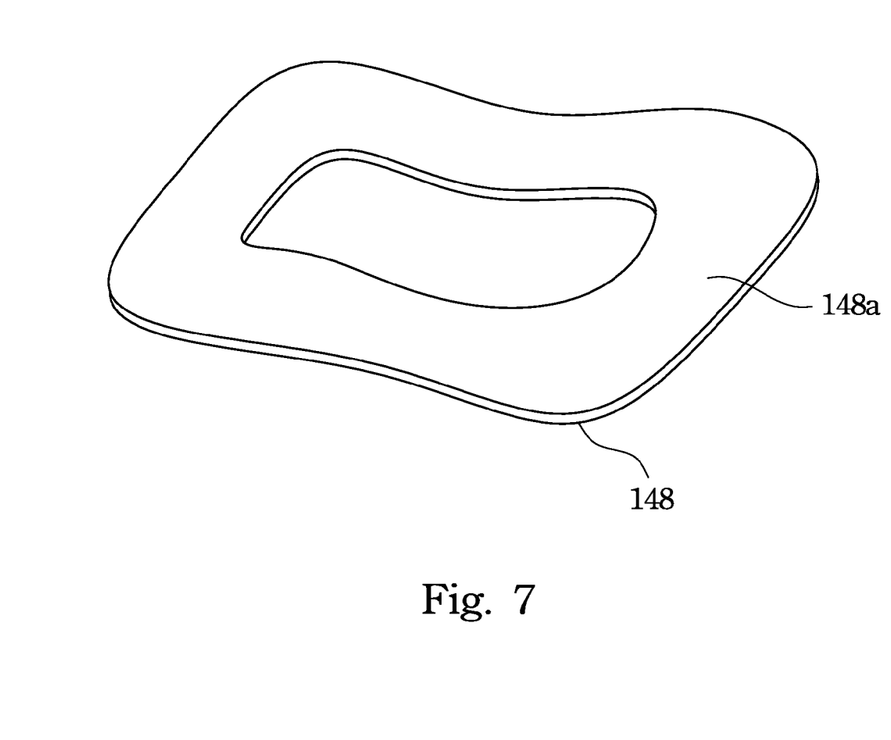
FIG. 7 is a perspective view of a spring washer in FIG. 2.

FIG. 7 is a perspective view of one of the spring washers 148 in FIG. 2

As shown in FIG. 2 and FIG. 7, each of the spring washers 148 has an uneven surface 148a. Therefore, when the spring washers 148 of the kickstand 14 are compressed between the first cam unit 146a of the cam assembly 146 and the nut 144b of the shaft assembly 144, the spring washers 148 apply a strong abutting force to the cam assembly 146 and thus effectively maintain an angle formed between the holder 140 and the bar 142 when the bar 142 rotates relative to the holder 140 to the opening position.

In the embodiment of the disclosure, in order to prevent abrasion between the nut 144b of the shaft assembly 144 and the spring washers 148, the shaft assembly 144 further includes a washer 144c disposed between the nut 144b and the spring washers 148, but the invention is not limited in this regard.

Moreover, the abutting force generated by the spring washers 148 is adjustable. In an embodiment of the disclosure, the abutting force of the spring washers 148 can be adjusted by increasing or decreasing the quantity of the spring washers 148. In another embodiment of the disclosure, the abutting force of the spring washers 148 can be adjusted by changing the distance between the first cam unit 146a of the cam assembly 146 and the nut 144b of the shaft assembly 144 (by moving the nut 144b relative to the threaded portion 144a2 of the shaft unit 144a), so as to make the compressed spring washers 148 generate an abutting force as required.

As shown in FIG. 1B and FIG. 2, the bar 142 of the kickstand 14 further has an abutting end 142b and a standing end 142c. The abutting end 142b of the bar 142 is in close proximity to the pivotal portion 142a, and the standing end 142c is away from the pivotal portion 142a. The abutting end 142b of the bar 142 abuts against the holder 140 when the bar 142 rotates relative to the holder 140 to the opening position. That is, when the bar 142 rotates relative to the holder 140 to the opening position, the crest 146b2 of the second cam unit 146b is meshed with the second trough 146a3 of the first cam unit 146a, and the abutting end 142b of the bar 142 abuts against the holder 140 at the same time (with reference to FIG. 4). Therefore, the bar 142 can precisely rotate relative to the holder 140 to the opening position without exceeding the angle formed between the holder 140 and the bar 142 corresponding to the opening position.

Figure 8:
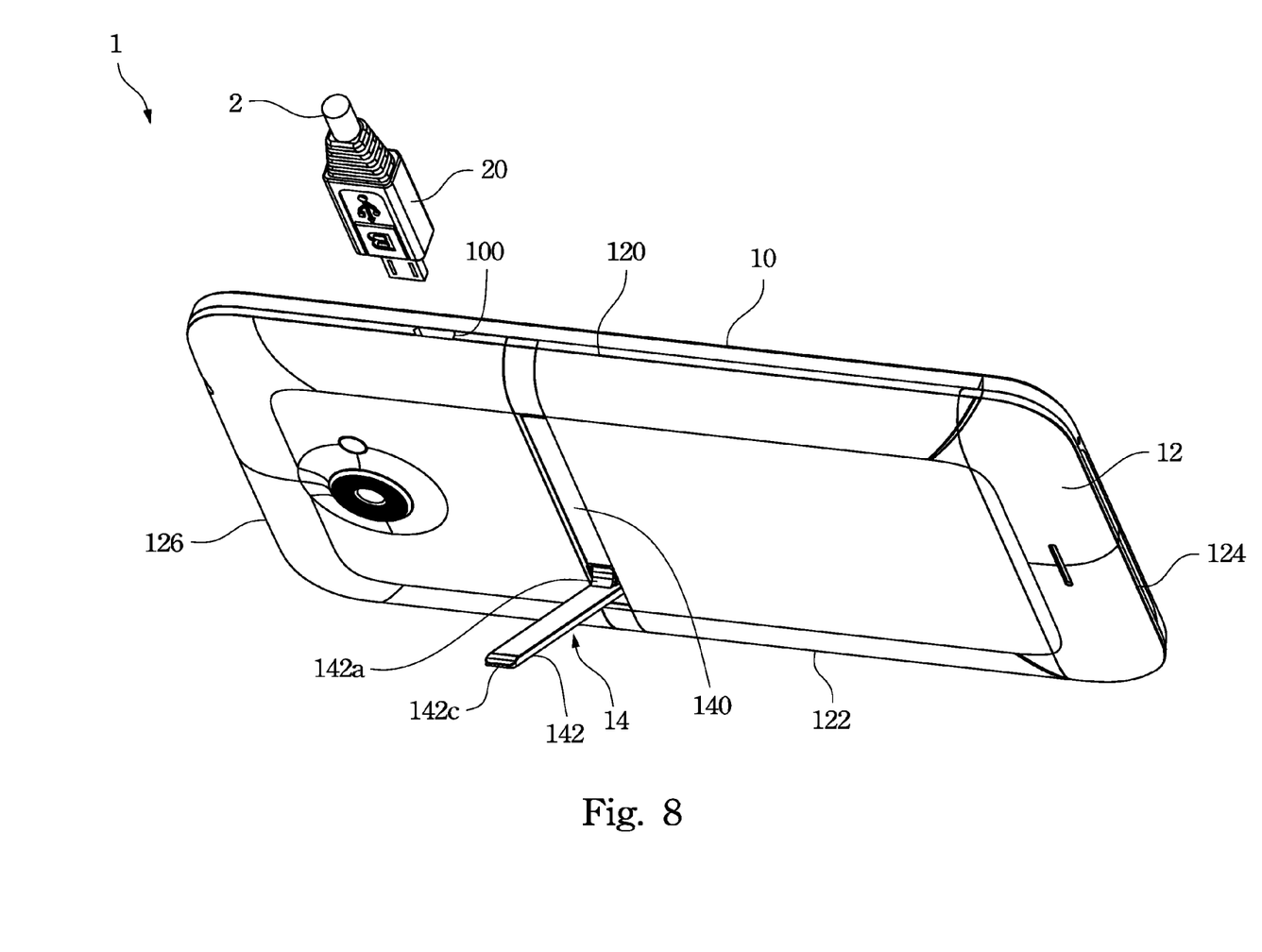
FIG. 8 is another perspective view of the handheld electronic apparatus in FIG. 1, in which a power line is electrically connected to a main body of the handheld electronic apparatus.

FIG. 8 is another perspective view of the handheld electronic apparatus 1 in FIG. 1, in which a power line 2 is electrically connected to the main body 10 of the handheld electronic apparatus 1.

As shown in FIG. 1B and FIG. 8, the housing 12 of the handheld electronic apparatus 1 has a first edge 120 (i.e., the upper edge in FIG. 8) and a second edge 122 (i.e., the upper edge in FIG. 1B) opposite to the first edge 120. In FIG. 1B, the handheld electronic apparatus 1 stands erect with the first edge 120 contacting the table. In FIG. 8, the handheld electronic apparatus 1 stands erect with the second edge 122 contacting the table. The main body 10 of the handheld electronic apparatus 1 has a power receptacle 100 located at the first edge 120 of the housing 12. The power line 2 includes a connector 20 that is capable of plugging into the power receptacle 100 of the main body 10. In an embodiment of the disclosure, the connector 20 of the power line 2 is a Mini USB (Universal Serial Bus) connector, but the invention is not limited in this regard.

In the embodiment of the disclosure, the pivotal portion 142a of the bar 142 is adjacent to the second edge 122 of the housing 12, and the standing end 142c of the bar 142 is adjacent to the first edge 120 when the bar 142 rotates to flatly abut against the holder 140 (i.e., the bar 142 rotates relative to the holder 140 to the closing position). With this configuration, the connector 20 of the power line 2 cannot plug into the power receptacle 100 of the main body 10 when the handheld electronic apparatus 1 stands erect with the first edge 120 contacting the table because the table blocks the power receptacle 100. However, the connector 20 of the power line 2 can plug into the power receptacle 100 of the main body 10 without problems when the handheld electronic apparatus 1 stands erect with the second edge 122 contacting the table, and the strong abutting force generated by the spring washers 148 and applied to the cam assembly 146 ensures that the bar 142 is not easily folded to abut against the holder 140.

In another embodiment of the disclosure, if the abutting force generated by the spring washers 148 is strong enough, the handheld electronic apparatus 1 can also stand erect with a third edge 124 or a fourth edge 126 of the housing 12 contacting the table.

In an embodiment of the disclosure, the housing 12 of the handheld electronic apparatus 1 and the holder 140 of the kickstand 14 can be integrally formed, but the disclosure is not limited in this regard.

According to the foregoing recitations of the embodiments of the disclosure, it can be seen that a bar of the kickstand of the disclosure can rotate relative to a holder of the kickstand so as to form an angle between the bar and the holder by using a cam assembly cooperated with at least one spring washer. The spring washer can apply a strong abutting force to the cam assembly, so that the cam assembly can effectively maintain the angle. That is, the strong abutting force applied to the cam assembly prevents the bar from being easily folded to abut against the holder. Furthermore, the size of the spring washer is small, and so an efficient utilization of space is realized with the kickstand equipped with the spring washer. The handheld electronic apparatus of the disclosure uses the foregoing kickstand that is equipped with the spring washer, and as a result, the handheld electronic apparatus can stand erect on a table with the support of the kickstand without risk of collapsing due to the folding of the kickstand. Moreover, because the strong abutting force applied to the cam assembly maintains the angle between the bar and the holder, the handheld electronic apparatus can stably stand erect on the table using any edge thereof through support of the kickstand.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A kickstand comprising:
a holder having an opening;
a bar;
a shaft assembly, wherein the bar is pivotally connected to the holder by the shaft assembly;
a cam assembly comprising a first cam unit engaged with the opening of the holder and a second cam unit engaged with the bar and pivotally connected to the shaft assembly, so as to allow the bar to rotate relative to the holder to a closing position or an opening position selectively; and
a plurality of spring washers engaged with the shaft assembly and abutting against the cam assembly, wherein each of the spring washers has an uneven surface.

2. The kickstand of claim 1, wherein the first cam unit has a first contacting surface, the first contacting surface at least has a first trough and a second trough, the second cam unit has a second contacting surface contacting the first contacting surface, the second contacting surface at least has a crest, and the bar rotates relative to the holder to the closing position when the crest is meshed with the first trough and rotates relative to the holder to the opening position when the crest is meshed with the second trough.

3. The kickstand of claim 2, wherein the holder has a first accommodating recess, the opening is communicated with the first accommodating recess, the bar comprises a pivotal portion having a second accommodating recess, the second cam unit is disposed in the second accommodating recess, and the pivotal portion is accommodated in the first accommodating recess.

4. The kickstand of claim 3, wherein the second cam unit further comprises an engaging portion, and the engaging portion is engaged with the inner wall of the second accommodating recess.

5. The kickstand of claim 3, wherein the holder further has a first pivotal hole, the first pivotal hole and the opening are respectively located at two opposite inner walls of the first accommodating recess, the pivotal portion further has a second pivotal hole communicated with the second accommodating recess, and the shaft assembly is pivotally connected to the first pivotal hole and the second pivotal hole.

6. The kickstand of claim 5, wherein the shaft assembly comprises:
a shaft unit sequentially passing through the first pivotal hole, the second pivotal hole, the second cam unit, the first cam unit, and the spring washers, the shaft unit having a head portion and a threaded portion respectively located at two ends of the shaft unit, wherein the head portion abuts against the holder, and the threaded portion protrudes out from the first cam unit; and
a nut fastened to the threaded portion, wherein the spring washers are compressed between the first cam unit and the nut.

7. The kickstand of claim 6, wherein the first cam unit has a third pivotal hole, the second cam unit has a fourth pivotal hole, and the shaft unit sequentially passes through the first pivotal hole, the second pivotal hole, the fourth pivotal hole, the third pivotal hole, and the spring washers.

8. The kickstand of claim 3, wherein the holder further has a third accommodating recess, an end of the third accommodating recess is communicated with the first accommodating recess, and the bar is accommodated in the third accommodating recess when the bar rotates relative to the holder to the closing position.

9. The kickstand of claim 3, wherein the bar further has an abutting end adjacent to the pivotal portion, and the abutting end abuts against the holder when the bar rotates relative to the holder to the opening position.

10. A handheld electronic apparatus comprising:
a main body;
a housing assembled to the main body; and
a kickstand comprising:
a holder fixed to the housing and having an opening;
a bar;

a shaft assembly, wherein the bar is pivotally connected to the holder by the shaft assembly;

a cam assembly comprising a first cam unit engaged with the opening of the holder and a second cam unit engaged with the bar and pivotally connected to the shaft assembly, so as to allow the bar to rotate relative to the holder to a closing position or an opening position selectively; and a plurality of spring washers engaged with the shaft assembly and abutting against the cam assembly, wherein each of the spring washers has an uneven surface.

11. The handheld electronic apparatus of claim 10, wherein the first cam unit has a first contacting surface, the first contacting surface at least has a first trough and a second trough, the second cam unit has a second contacting surface contacting the first contacting surface, the second contacting surface at least has a crest, and the bar rotates relative to the holder to the closing position when the crest is meshed with the first trough and rotates relative to the holder to the opening position when the crest is meshed with the second trough.

12. The handheld electronic apparatus of claim 11, wherein the holder has a first accommodating recess, the opening is communicated with the first accommodating recess, the bar comprises a pivotal portion having a second accommodating recess, the second cam unit is disposed in the second accommodating recess, and the pivotal portion is accommodated in the first accommodating recess.

13. The handheld electronic apparatus of claim 12, wherein the second cam unit further comprises an engaging portion, and the engaging portion is engaged with the inner wall of the second accommodating recess.

14. The handheld electronic apparatus of claim 12, wherein the holder further has a first pivotal hole, the first pivotal hole and the opening are respectively located at two opposite inner walls of the first accommodating recess, the pivotal portion further has a second pivotal hole communicated with the second accommodating recess, and the shaft assembly is pivotally connected to the first pivotal hole and the second pivotal hole.

15. The handheld electronic apparatus of claim 14, wherein the shaft assembly comprises:

a shaft unit sequentially passing through the first pivotal hole, the second pivotal hole, the second cam unit, the first cam unit, and the spring washers, the shaft unit having a head portion and a threaded portion respectively located at two ends of the shaft unit, wherein the head portion abuts against the holder, and the threaded portion protrudes out from the first cam unit; and a nut fastened to the threaded portion, wherein the spring washers are compressed between the first cam unit and the nut.

16. The handheld electronic apparatus of claim 15, wherein the first cam unit has a third pivotal hole, the second cam unit has a fourth pivotal hole, and the shaft unit sequentially passes through the first pivotal hole, the second pivotal hole, the fourth pivotal hole, the third pivotal hole, and the spring washers.

17. The handheld electronic apparatus of claim 12, wherein the holder further has a third accommodating recess, an end of the third accommodating recess is communicated with the first accommodating recess, and the bar is accommodated in the third accommodating recess when the bar rotates relative to the holder to the closing position.

18. The handheld electronic apparatus of claim 12, wherein the bar further has an abutting end adjacent to the pivotal portion, and the abutting end abuts against the holder when the bar rotates relative to the holder to the opening position.

19. The handheld electronic apparatus of claim 18, wherein the housing has a first edge and a second edge opposite to the first edge, the main body has a power receptacle located at the first edge, the pivotal portion is adjacent to the second edge, the bar further has a standing end, and the standing end is adjacent to the first edge when the bar rotates relative to the holder to the closing position.

20. The handheld electronic apparatus of claim 10, wherein the housing and the holder are integrally formed.

* * * * *